US006993023B2

(12) United States Patent
Foster et al.

(10) Patent No.: US 6,993,023 B2
(45) Date of Patent: Jan. 31, 2006

(54) PARALLEL ANALYSIS OF INCOMING DATA TRANSMISSIONS

(75) Inventors: Michael S. Foster, Federal Way, WA (US); Michael A. Dorsett, Federal Way, WA (US)

(73) Assignee: The Boeing Company, Seattle, WA (US)

( * ) Notice: Subject to any disclaimer, the term of this patent is extended or adjusted under 35 U.S.C. 154(b) by 972 days.

(21) Appl. No.: 10/039,784

(22) Filed: Oct. 26, 2001

(65) Prior Publication Data
US 2003/0202535 A1 Oct. 30, 2003

Related U.S. Application Data

(60) Provisional application No. 60/314,287, filed on Aug. 22, 2001, provisional application No. 60/314,158, filed on Aug. 21, 2001, provisional application No. 60/314,088, filed on Aug. 21, 2001, provisional application No. 60/287,069, filed on Apr. 27, 2001, provisional application No. 60/287,120, filed on Apr. 27, 2001, provisional application No. 60/286,922, filed on Apr. 27, 2001, provisional application No. 60/287,081, filed on Apr. 27, 2001, provisional application No. 60/287,075, filed on Apr. 27, 2001.

(51) Int. Cl.
H04L 12/56 (2006.01)
(52) U.S. Cl. ............... 370/389; 370/351; 370/474

(58) Field of Classification Search .............. 370/351, 370/389, 392, 395.3, 395, 5, 397, 409, 400, 370/401, 402, 428, 474, 471, 490; 709/105, 709/106, 201
See application file for complete search history.

(56) References Cited

U.S. PATENT DOCUMENTS

| | | | |
|---|---|---|---|
| 5,727,051 A * | 3/1998 | Holender | 379/112.05 |
| 5,872,783 A | 2/1999 | Chin | |
| 5,892,766 A | 4/1999 | Wicki et al. | |
| 5,940,596 A | 8/1999 | Rajan et al. | |
| 6,034,956 A | 3/2000 | Olnowich et al. | |
| 6,147,976 A | 11/2000 | Shand et al. | |
| 6,215,412 B1 | 4/2001 | Franaszek et al. | |
| 6,363,077 B1 * | 3/2002 | Wong et al. | 370/422 |
| 6,434,618 B1 * | 8/2002 | Cohen et al. | 709/228 |

* cited by examiner

Primary Examiner—Brenda Pham
(74) Attorney, Agent, or Firm—Perkins Coie LLP

(57) ABSTRACT

A method, system, and computer-readable medium for integrating multiple techniques for processing data communications is described in which the processing steps shared by multiple of the techniques do not have to be duplicated by each of the techniques. In some situations, some or all of the multiple processing techniques are performed in parallel, such as on different processors. In some situations, a Multi-Protocol Edge Switch ("MPEX") is used to integrate multiple processing techniques for received data communications that are to be forwarded to a destination, such as by performing protocol translation, performing load balancing between multiple alternative destinations on one or more of the networks to which the MPEX belongs, performing firewall and other content-based analysis for any or all of the nodes on one or more of the networks to which the MPEX belongs, and/or providing content-based routing of data communications in order to identify appropriate destinations.

55 Claims, 7 Drawing Sheets

Example Outgoing Fibre Channel Frame With TCP/IP Packet Payload Containing An HTTP Request Message

| | | |
|---|---|---|
| 252 | <Start Of Frame> | 4 bytes |
| 254 | <Routing Control> | 1 byte – specifies frame category (e.g., data) & possibly function (e.g., unsolicited request) |
| 256 | A2-37-B5 | destination port physical address – 3 bytes (shown in hex format) |
| 258 | <Class Specific Control> | 1 byte (can include priority and preemption information) |
| 260 | 6B-21-1D | source port physical address – 3 bytes (hex format) |
| 262 | 05 | payload type – 1 byte (hex format – 05 is IP packet) |
| 264 | <Various FC header fields> | 15 bytes (includes an indication if payload has optional headers) |
| 266 | <Optional Headers> | variable length (protocol-specific headers) |
| 268 | <Various IP header fields> | 9 bytes (includes Type of Service and Length) |
| 270 | 06 | payload protocol – 1 byte (hex format – 06 is TCP) |
| 272 | <IP Header Checksum> | 2 bytes |
| 274 | 153.83.28.125 | source IP address – 4 bytes (byte-decimal format) |
| 276 | 128.32.78.105 | destination IP address – 4 bytes (byte-decimal format) |
| 278 | <IP Header Options> | variable length |
| 280 | 3183 | source port – 2 bytes (decimal format) |
| 282 | 80 | destination port – 2 bytes (decimal format – 80 is HTTP) |
| 284 | <Various TCP header fields> | 20 bytes (hex format) |
| 286 | GET /pub/text.html HTTP/1.1 | HTTP request line – variable length (text format) |
| 288 | Host: www.XYZ.com | |
| 290 | User-agent: Mozilla/3.04 | HTTP message header fields – variable length (text format) |
| 292 | ... | |
| 294 | | HTTP message body – variable length (text format) |
| 296 | <Cyclic Redundancy Check> | 4 bytes |
| 298 | <End Of Frame> | 4 bytes |

Fibre Channel frame header (covers 252–264)
Fibre Channel frame payload (IP packet) (covers 266–294)
IP packet header (covers 266–278)
IP packet payload (TCP packet) (covers 280–294)
TCP packet header (covers 280–284)
TCP packet payload (HTTP Request Message) (covers 286–294)

PARALLEL ANALYSIS OF INCOMING DATA TRANSMISSIONS

CROSS-REFERENCE TO RELATED APPLICATION(S)

This application claims the benefit of U.S. Provisional Application No. 60/287,069 entitled "METHOD FOR IMPLEMENTING A CLUSTER NETWORK FOR HIGH PERFORMANCE AND HIGH AVAILABILITY USING A FIBRE CHANNEL SWITCH FABRIC," filed Apr. 27, 2001; U.S. Provisional Application No. 60/287,120 entitled "MULTI-PROTOCOL NETWORK FOR ENTERPRISE DATA CENTERS," filed Apr. 27, 2001; U.S. Provisional Application No. 60/286,918 entitled "UNIFIED ENTERPRISE NETWORK SWITCH (UNEX) PRODUCT SPECIFICATION," filed Apr. 27, 2001; U.S. Provisional Application No. 60/286,922 entitled "QUALITY OF SERVICE EXAMPLE," filed Apr. 27, 2001; U.S. Provisional Application No. 60/287,081 entitled "COMMUNICATIONS MODEL," filed Apr. 27, 2001; U.S. Provisional Application No. 60/287,075 entitled "UNIFORM ENTERPRISE NETWORK SYSTEM," filed Apr. 27, 2001; U.S. Provisional Application No. 60/314,088 entitled "INTERCONNECT FABRIC MODULE," filed Aug. 21, 2001; U.S. Provisional Application No. 60/314,287 entitled "INTEGRATED ANALYSIS OF INCOMING DATA TRANSMISSIONS," filed Aug. 22, 2001; U.S. Provisional Application No. 60/314,158 entitled "USING VIRTUAL IDENTIFIERS TO ROUTE TRANSMITTED DATA THROUGH A NETWORK," filed Aug. 21, 2001, and is related to U.S. patent application Ser. No. 10/062,199 entitled "METHOD AND SYSTEM FOR VIRTUAL ADDRESSING IN A COMMUNICATIONS NETWORK," U.S. patent application Ser. No. 10/066,104 entitled "METHOD AND SYSTEM FOR LABEL TABLE CACHING IN A ROUTING DEVICE," U.S. patent application Ser. No. 10/039,505 entitled "METHOD AND SYSTEM FOR MULTIFRAME BUFFERING IN A ROUTING DEVICE," U.S. patent application Ser. No. 10/046,333 entitled "METHOD AND SYSTEM FOR DOMAIN ADDRESSING IN A COMMUNICATIONS NETWORK," U.S. patent application Ser. No. 10/039,404 entitled "METHOD AND SYSTEM FOR INTERSWITCH LOAD BALANCING IN A COMMUNICATIONS NETWORK," U.S. patent application Ser. No. 10/046,572 entitled "METHOD AND SYSTEM FOR INTERS WITCH DEADLOCK AVOIDANCE IN A COMMUNICATIONS NETWORK," U.S. patent application Ser. No. 10/039,877 entitled "METHOD AND SYSTEM FOR CONNECTION PREEMPTION IN A COMMUNICATIONS NETWORK," U.S. patent application Ser. No. 10/061,564 entitled "METHOD AND SYSTEM FOR MULTICASTING IN A ROUTING DEVICE," U.S. patent application Ser. No. 10/046,640 entitled "METHOD AND SYSTEM FOR NETWORK CONFIGURATION DISCOVERY IN A NETWORK MANAGER," U.S. patent application Ser. No. 10/046,334 entitled "METHOD AND SYSTEM FOR PATH BUILDING IN A COMMUNICATIONS NETWORK," U.S. patent application Ser. No. 10/039,703 entitled "METHOD AND SYSTEM FOR RESERVED ADDRESSING IN A COMMUNICATIONS NETWORK," U.S. patent application Ser. No. 10/039,814 entitled "METHOD AND SYSTEM FOR RECONFIGURING A PATH IN A COMMUNICATIONS NETWORK," U.S. patent application Ser. No. 10/066,217 entitled "METHOD AND SYSTEM FOR ADMINISTRATIVE PORTS IN A ROUTING DEVICE," U.S. patent application Ser. No. 10/039,784 entitled "PARALLEL ANALYSIS OF INCOMING DATA TRANSMISSIONS," U.S. patent application Ser. No. 10/066,159 entitled "INTEGRATED ANALYSIS OF INCOMING DATA TRANSMISSIONS," U.S. patent application Ser. No. 10/062,245 entitled "USING VIRTUAL IDENTIFIERS TO ROUTE TRANSMITTED DATA THROUGH A NETWORK," U.S. patent application Ser. No. 10/044,182 entitled "USING VIRTUAL IDENTIFIERS TO PROCESS RECEIVED DATA ROUTED THROUGH A NETWORK," U.S. patent application Ser. No. 10/044,164 entitled "METHOD AND SYSTEM FOR PERFORMING SECURITY VIA VIRTUAL ADDRESSING IN A COMMUNICATIONS NETWORK," and U.S. patent application Ser. No. 10/068,329 entitled "METHOD AND SYSTEM FOR PERFORMING SECURITY VIA DE-REGISTRATION IN A COMMUNICATIONS NETWORK," which are all hereby incorporated by reference in their entirety.

TECHNICAL FIELD

The following disclosure relates generally to computer networks, and more particularly to performing multiple analysis techniques in parallel when processing data transmitted through a network.

BACKGROUND

The Internet has emerged as a critical commerce and communications platform for businesses and consumers worldwide. The dramatic growth in the number of Internet users, coupled with the increased availability of powerful new tools and equipment that enable the development, processing, and distribution of data across the Internet, have led to a proliferation of Internet-based applications. These applications include e-commerce, e-mail, electronic file transfers, and online interactive applications. As the number of users of and uses for the Internet increases, so does the complexity and volume of Internet traffic. Because of this traffic and its business potential, a growing number of companies are building businesses around the Internet and developing mission-critical business applications to be provided by the Internet.

Existing enterprise data networks ("EDNs") that support e-commerce applications are straining under the demand to provide added performance and services to customers. In particular, the growing customer demands for services have resulted in increasingly complex ad hoc EDNs. Current architectures of EDNs typically include three sub-networks: 1) a web server local area network (LAN), 2) a computational network for application servers, and 3) a storage area network (SAN). The processing and storage elements attached to these sub-networks may have access to a wide area network (WAN) or metropolitan area network (MAN) through a bridging device commonly known as an edge switch. Unfortunately, each of these sub-networks typically uses a distinct protocol and associated set of hardware and software, including network interface adapters, network switches, network operating systems, and management applications. Communication through the EDN requires bridging between the sub-networks that requires active participation of server processing resources for protocol translation and interpretation. There are a variety of disadvantages to the current architecture of EDNs, many of which result because the sub-networks and associated applications are developed by different vendors, and it is difficult to integrate, manage, maintain and scale such inter-vendor EDNs.

One particular disadvantage to the current architecture of EDNs relates to the need to perform a variety of types of processing on data communications, such as to provide load balancing between multiple alternative destinations, to provide firewall functionality for incoming data communications, to provide content-based routing of data communications in order to identify destinations, and to provide protocol translation functionality to allow data communications specified using one network protocol to be transmitted over a network using a different network protocol. Many such data communication processing techniques include various common steps, such as deconstructing received data frames or packets based on the network protocols used to encode the data in order to extract various relevant header and payload information. Due in part to the various disparate hardware and software used by current typical multi-vendor EDNs, however, each such data communication processing technique is typically provided by a different hardware and software component. The cost of providing each of these many different components and the difficulty of incorporating such components together lead many systems to forego desired and useful functionality. Moreover, even those few systems that do provide multiple such data communication processing techniques using multiple disparate components suffer from delays and inefficiencies caused by the components performing redundant steps that were already performed by other of the components. The ability to provide affordable, high-performance EDN solutions with extensive scalability, very high availability, and ease of management is thus significantly compromised or completely lost by such ad hoc existing systems.

In addition to inter-vendor problems that exist in current EDN architectures, it is often difficult for even a single device such as an edge switch to forward data to appropriate destinations in a secure manner, particularly with any guarantees as to the Quality Of Service ("QOS") of the transmissions. For example, current architectures typically assign one or more network addresses to each node in a network (e.g., logical network addresses such as IP addresses and/or physical network addresses such as Media Access Control ("MAC") addresses), and network routing and switching devices use the network addresses of a destination node to route transmissions of data from a source node to that destination node. However, it is difficult to prevent unauthorized source nodes from sending data to a destination node with a known network address, particularly if the source nodes masquerade their identities by spoofing their own network addresses, and correspondingly it is difficult for a destination node to ensure that received data is from an authorized source. In addition, it can be difficult for even an authorized source node to transmit data to desired destinations, as the source node must know the appropriate network address or other logical name (e.g., a DNS name) that is assigned or mapped to a destination node in order to perform the transmitting. Even more difficult are situations in which the appropriate destinations are difficult to identify, such as when publishing data of a type that may be of interest to various potential subscriber destinations. Finally, current architectures typically do not ensure that transmitted data will be processed with a desired QOS, such as a minimum network latency or minimum level of throughput.

BRIEF DESCRIPTION OF THE DRAWINGS

FIGS. 2A and 2B illustrate an example of an incoming data frame from an Ethernet-based network being translated to an outgoing data frame on a Fibre Channel-based network.

DETAILED DESCRIPTION

Figure 1:
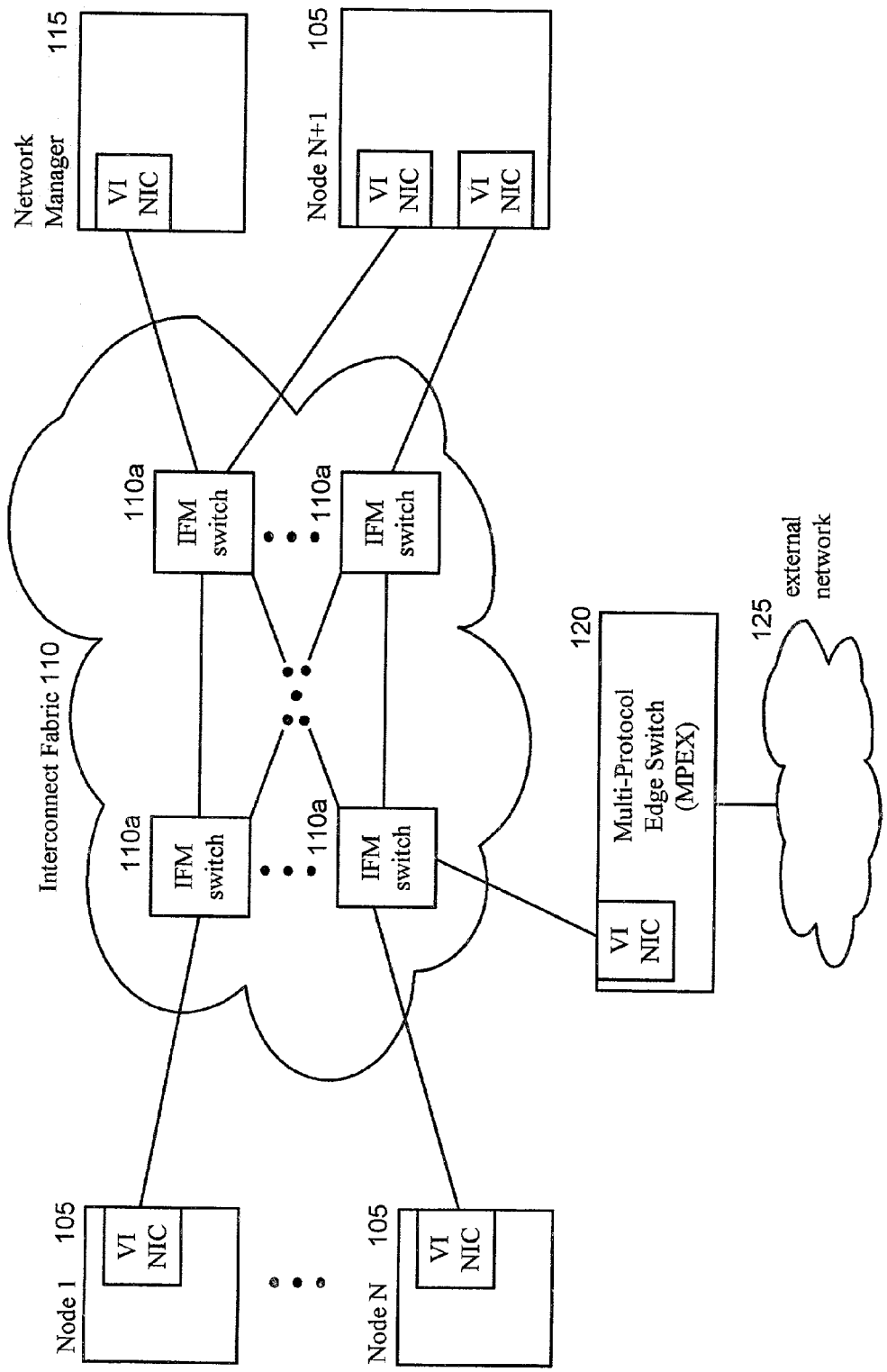
FIG. 1 is a network diagram illustrating an example Fibre Channel Interconnect Fabric-based network that is connected to an external network using a different network protocol via a Multi-Protocol Edge Switch.

A software facility is described below that integrates multiple techniques for processing data communications in such a manner that some or all of the processing steps shared by multiple of the techniques are performed only once. In some embodiments, some or all of the multiple processing techniques are performed in parallel, such as on different processors, in order to further speed their performance. Integrating the multiple processing techniques provides a variety of benefits, as discussed in greater detail below.

In some embodiments, a Multi-Protocol Edge Switch ("MPEX") is used to integrate multiple processing techniques for received data communications from one network that are to be forwarded to a destination on a different network. Such MPEXs are typically designed to act as a gateway that bridges networks using multiple data link layer network protocols (i.e., layer 2 of the 7-layer ISO network model), such as Ethernet and Fibre Channel. In particular, such MPEXs typically receive incoming data communications that are encoded with a source network protocol used by a source network to which the MPEX belongs, and perform protocol translation in order to construct an outgoing data communication that corresponds to the received data communication but is encoded with a different destination network protocol used by a different destination network. In embodiments discussed in greater detail below, MPEXs are enhanced so as to integrate one or more additional data communication processing techniques in such a manner that common processing steps, such as deconstructing incoming data frames or packets in order to identify relevant header and payload information, are performed only once. Moreover, some MPEX embodiments use specialized hardware, such as a network processor (e.g., a C-Port C-5 network processor from C-Port Corporation), to enhance the speed of the common processing steps and/or the non-common processing steps.

In some embodiments, enhanced MPEXs provide multiple processing techniques that can include some or all of protocol translation processing, load balancing between multiple alternative destinations on one or more of the networks to which the MPEX belongs, firewall and other content-based analysis for any or all of the nodes on one or more of the networks to which the MPEX belongs, and content-based routing of data communications in order to identify appropriate destinations and/or transmission routes. Various other data communication processing techniques can similarly be integrated together. Moreover, some embodiments of the MPEX perform some or all of the additional processing techniques and protocol translation processing in parallel (e.g., the non-common processing steps), such as on individual general-purpose processors (e.g., PowerPC processors from Motorola, Inc.) that are appropriately configured.

In other embodiments, multiple data communication processing techniques are integrated together by devices other than an MPEX, such as by any intermediate device or component that receives data communications before forwarding them to an ultimate destination. In addition, various specialized hardware can be used in some embodiments to assist in the performance of some or all of the data communication processing techniques. For example, content-based routing of data communications (e.g., by analyzing data communications at some or all of layers 4–7 of the ISO networking model, such as to assist in determining appropriate destinations) and/or load balancing may be assisted with products such as the CSS 11000 series of switches (e.g., the CSS 11154) and/or the Content Router 4400 from Cisco Systems, Inc., the WebSphere Edge Server from IBM Corporation, and the ACEdirector Web switch from Alteon WebSystems.

In addition, some embodiments of the MPEX or other intermediate device use virtual identifiers to route communications through one or more of the networks to which that MPEX or other intermediate device belongs. Each virtual identifier is assigned in some embodiments to a path through a network to one or more destinations, such as by a network manager for that network. Using virtual identifiers for routing of communications, rather than network addresses or logical names that are specific to a destination, provides a variety of benefits as discussed in greater detail below.

In particular, embodiments of MPEXs or other intermediate devices that use virtual identifiers to route data communications include one or more Virtual Identifier ("VI") Network Interface Controller ("NIC") facilities (e.g., one VI NIC for each network interface). When a VI NIC receives an indication that a data communication to one or more remote nodes on a network is to occur, such as from a local or remote application, the VI NIC will identify an appropriate transmittal virtual identifier that can be used to route the data communication through the network to the appropriate remote destination nodes without being assigned to or directly associated with those destination nodes. Such data communications can include both transitory connectionless transmittals of data (e.g., unidirectional transmittals from a source to a destination) and non-transitory connections that allow multiple distinct transmittals of data (e.g., a persistent dedicated connection that allows a connection-initiating source and a connection destination to transmit data back and forth).

The VI NIC can identify an appropriate transmittal virtual identifier for routing a data communication in various ways. In some embodiments, the VI NIC will register some or all outgoing data communications with a network manager for a network, and will receive an appropriate transmittal virtual identifier to be used for that communication through that network from the network manager. If an indicated data communication corresponds to a previously registered data communication (e.g., to an existing connection or to a previous communication to the same destination and in the same transmission manner), however, the VI NIC could instead in some embodiments use the previously received transmittal virtual identifier for that data communication rather than perform an additional registration for the indicated data communication. The manners in which a data communication can be transmitted vary with the transmission characteristics that are supported by a network, and can include factors such as a particular Class Of Service ("COS") or transmission priority.

In some embodiments in which virtual identifiers are assigned to paths through a network, the assignment of paths to such virtual path identifiers is performed in a dynamic fashion after an indication is received that a data communication is to occur, such as by the network manager upon receipt of a data communication registration. The assigning of a virtual path identifier to a path can include the configuring of each of one or more intermediate routing devices (e.g., routers or switches) along the path to the destination, such as by the network manager, so that when one of the routing devices receives a data communication that includes the virtual identifier it will forward the communication in an appropriate manner either directly to the destination or instead to a next routing device along the path that is similarly configured.

The VI NIC can also assist in some embodiments in determining appropriate destinations for an indicated data communication, either directly or in conjunction with the network manager (e.g., by registering the data communication with the network manager), with the transmittal virtual identifier for that data communication selected so as to route the data communication to those destinations. In some situations, the indicated data communication may explicitly specify a destination, such as with a destination network address, while in other situations a destination may not be specified, such as when an application is publishing information and is relying on a third party to route the information to one or more current subscribers for that information. Regardless of whether a destination is specified, however, the VI NIC and/or the network manager in those embodiments can select one or more destinations that are appropriate for the indicated data communication, even if the specified destination is not among the selected destinations. This destination selection can be made by considering one or more of various factors, including any destinations specified, any expressions of interest made by potential recipients in the data communication (e.g., subscription requests), the type or classification of data being communicated, the manner of the data communication (e.g., a specified COS and/or transmission priority), the identity or type of the source node and/or source application, the type of a destination application, etc.

In some situations, a source of an indicated data communication may specify a destination using a destination network address that is not mapped to any node in the network, and if so the VI NIC and/or the network manager could then select an appropriate destination for that destination network address. Multiple destinations can also be selected for an indicated data communication, even if that data communication specified a single destination (which may or may not be one of the selected destinations). If so, a single transmittal virtual identifier can be used to route the data communication to each of the multiple selected destinations, such as by configuring one or more intermediary routing devices to divide received communications that use that transmittal virtual identifier so as to forward a copy of such received communications to each of multiple destinations (or multiple next routing devices).

In some embodiments, virtual identifiers correspond to paths through a network that are specific to a source. If so, a single virtual identifier can be used by different sources for different paths, such as to different destinations if the different paths do not overlap. The use of virtual addresses also allows a path corresponding to a virtual identifier to be reconfigured in a manner transparent to a source using that virtual identifier, such as to correspond to a different path to the same destination or to a path to a different destination.

In some embodiments, when a data communication indicated by a source can result in bi-directional communication (e.g., a response from one or more of the destinations), the VI NIC also identifies a response virtual identifier that can be used for routing data from one or more of the destinations back to the source. If the VI NIC registers the data communication with a network manager, this response virtual identifier may be received from the network manager. After identifying this response virtual identifier, the VI NIC associates it with information indicating how to process received data communications that are routed using the response virtual identifier. Such received data communications can be processed in various ways, such as by forwarding the data communications to one or more resources associated with the destination node (e.g., an executing application program, a file on storage, or a device that is part of the node). For example, if a source application on a source node initiates a bi-directional communication, a VI NIC for the source node may associate the response virtual identifier with that source application so that received responses can be forwarded to that source application (which then becomes the destination application for those received communications). Alternatively, a VI NIC on an MPEX could process received data communications using one or more of the previously mentioned processing techniques before forwarding a corresponding created outgoing data communication to a remote node on another network.

The association of a virtual identifier with a corresponding destination application to which a data communication will be forwarded can be performed in various ways. For example, software applications that communicate using TCP/IP mechanisms often use TCP/IP sockets, which include a combination of an IP address and a software port number specific to a computing device using that IP address. Thus, in those embodiments the response virtual identifier can be associated with socket information for the source application. In a similar manner, in some embodiments a destination node associates transmittal virtual identifiers used to route data communications to that destination with an appropriate resource local to the destination node, such as based on information provided to the destination node by the network manager as part of the registering of those data communications and/or based on information included as part of the data communications.

When the VI NIC has access to application-specific information for a destination application for a received communication, such as TCP/IP socket information that is associated with a response virtual identifier, the VI NIC can use the information to provide additional benefits. For example, many network nodes and/or applications executing on such nodes require that various information be correctly specified in a received communication in order for that communication to be accepted, such as for security reasons. One example is that a destination application using TCP/IP communication mechanisms may require that any received transmissions include the correct TCP/IP socket information corresponding to that application. However, the previously discussed use of transmittal virtual identifiers can result in valid communications being received having incorrect TCP/IP socket information for a destination application, as discussed in greater detail below. When this occurs, the VI NIC that receives the communication can replace the incorrect included TCP/IP socket information with the correct information for the application by using the TCP/IP socket information that is associated with the transmittal virtual identifier used to route the communication. In addition, in some embodiments the VI NIC may verify the accuracy of the received communication in various ways before performing such information replacement.

The use of virtual identifiers can result in valid received communications that have incorrect information for a destination application in various ways. For example, if a source application specifies a destination IP address and that destination IP address is included in the data being communicated (e.g., in a location reserved for such a destination network address), but a VI NIC for that source application identifies one or more destinations that do not correspond to that destination IP address (e.g., that have other IP addresses), then the data communication will include a specified destination IP address that does not correspond to the IP addresses used by applications at the identified destinations. In addition, if multiple destinations with different IP addresses are identified by the VI NIC when only a single destination IP address was specified, most of the destinations will receive communications that do not include correct IP address information. In such situations, the VI NIC that receives the communication can replace the incorrect included IP address information with the correct IP address information for the application by using the TCP/IP socket information that is associated with the virtual identifier used to route the communication. Those skilled in the art will appreciate that a similar information replacement can be used for other communication mechanisms. In addition, in situations in which a data communication is being routed to only a single destination, the VI NIC that sends the data communication can perform the information replacement if that VI NIC has access to the necessary application-specific information for the destination application.

In some embodiments, a VI NIC can also identify information related to routing a data communication other than a transmittal virtual identifier, either directly or in conjunction with the network manager (e.g., by registering the data communication with the network manager). For example, the VI NIC may identify one or more QOS parameters that relate to a manner in which the data communication should occur, such as a specified COS and/or a priority to be used for the transmission of the data. If so, the VI NIC can also use such QOS parameters when transmitting data for that data communication.

Additional details about integrating multiple data communication processing techniques and about the use of virtual identifiers are discussed in the following patent applications, each of which are incorporated by reference in their entirety: Provisional U.S. Application No. 60/287,068, filed Apr. 27, 2001, entitled "GENERATION OF SYNCHRONIZED 50% DUTY CYCLE CLOCKS"; Provisional U.S. Application No. 60/287,121, filed Apr. 27, 2001, entitled "FREQUENCY DETECTION AND LOCK FOR PHASED LOCK LOOP"; Provisional U.S. Application No. 60/287,069, filed Apr. 27, 2001, entitled "METHOD FOR IMPLEMENTING A CLUSTER NETWORK FOR HIGH PERFORMANCE AND HIGH AVAILABILITY USING A FIBRE CHANNEL SWITCH FABRIC"; Provisional U.S. Application No. 60/287,120, filed Apr. 27, 2001, entitled "MULTI-PROTOCOL NETWORK FOR ENTERPRISE DATA CENTERS"; Provisional U.S. Application No. 60/286,918, filed Apr. 27, 2001, entitled "UNIFIED ENTERPRISE NETWORK SWITCH (UENX) PRODUCT SPECIFICATION"; Provisional U.S. Application No. 60/286,922, filed Apr. 27, 2001, entitled "QUALITY OF SERVICE EXAMPLE"; Provisional U.S. Application No. 60/287,081, filed Apr. 27, 2001, entitled "COMMUNICATIONS MODEL"; and Provisional U.S. Application No. 60/287,075, filed Apr. 27, 2001, entitled "UNIFORM ENTERPRISE NETWORK SYSTEM". Each of the following patent applications similarly include additional details about integrating multiple data communication processing techniques and about the use of virtual identifiers, and are also each hereby incorporated by reference in their entirety: Provisional U.S. Application No. 60/314,088, filed Aug. 21, 2001 and entitled "INTERCONNECT FABRIC MODULE"; and Provisional U.S. Application No. 60/314,158, filed Aug. 21, 2001 and entitled "USING VIRTUAL IDENTIFIERS TO ROUTE TRANSMITTED DATA THROUGH A NETWORK".

For illustrative purposes, some embodiments are described below in which an MPEX is used to connect a Fibre Channel-based network to a network using another network protocol and/or in which an MPEX is used as part of an EDN architecture. However, those skilled in the art will appreciate that the techniques of the invention can be used in a wide variety of other situations and with other types of devices and networks, including InfiniBand-based networks and devices, and that the invention is not limited to use with Fibre Channel networks or with EDN architectures. Additional details about Fibre Channel are available in "Fibre Channel: A Comprehensive Introduction," which is authored by Robert W. Kembel and published by Northwest Learning Associates, Inc., and which is hereby incorporated by reference in its entirety. Additional details about InfiniBand is available in the "InfiniBand Architecture Specification, Volumes 1 and 2, Release 1.0.a", dated Jun. 19, 2001 and available at the time of this writing at the website for the InfiniBand Trade Association at "www.infinibandta.org", and which is hereby incorporated by reference in its entirety.

FIG. 1 is a network diagram illustrating various nodes of an example Fibre Channel fabric-based interconnect network that are inter-communicating using virtual identifiers. In this example embodiment, multiple interconnect fabric modules ("IFMs") 110 with high-speed switching capabilities are used as intermediate routing devices to form an interconnect fabric, and multiple nodes 105, a network manager 115 and a Multi-Protocol Edge Switch ("MPEX") 120 are connected to the fabric. Each of the nodes has at least one VI NIC that uses virtual identifiers when communicating and receiving data. The MPEX is used to connect the Fibre Channel network to an external network, such as an Ethernet-based network or InfiniBand-based network, and similarly includes at least one VI NIC. Data is transmitted through the interconnect fabric using frames such as those defined by the Fibre Channel standard.

In this example embodiment, an IFM can be dynamically configured to interconnect its communications ports so that data can be transmitted through the interconnected ports. When the network manager receives a registration indication from a VI NIC for a data communication from a source node to a destination node, the network manager selects transmittal and response virtual identifiers to be used by the source and destination nodes when sending frames to each other. When the VI NIC is part of an MPEX, the transmittal and response virtual identifiers can be supplied to the MPEX and/or to the source or destination node on the remote network for use. The network manager also identifies a path through the IFMs and their ports which frames will use when moving between the nodes. The network manager then configures the IFMs of the identified path so that when a frame that indicates the transmittal or response virtual identifiers is received at one of the IFMs, that frame is forwarded to the destination or source nodes via the path as appropriate. While the transmittal and response virtual identifiers thus use the same path (in opposite directions) in this example embodiment, they can use distinct paths in other embodiments.

Each IFM may maintain a virtual identifier table for each of its ports that maps virtual identifiers to its destinations ports. When a frame is received at a source port, the IFM then uses the virtual identifier for that frame and the virtual identifier table for the source port to identify a destination port through which the frame is to be forwarded. Thus, in this embodiment, a virtual identifier identifies a path between devices, rather than identifying a source or a destination device. In one embodiment, a virtual identifier includes both a domain address and a virtual address. Each IFM is assigned a domain address, with the IFMs that are assigned the same domain address being in the same domain. The IFMs use the domain addresses to forward frames between domains, and the network manager may also configure the IFMs with inter-domain paths. When an IFM receives a frame whose virtual identifier has a domain address that matches its domain address, then the frame has arrived at its destination domain. The IFM then forwards the frame in accordance with the virtual address of the virtual identifier. If, however, the domain addresses do not match, then the frame has not arrived at its destination domain, and the IFM forwards the frame using an inter-domain path. The virtual identifier table for an IFM port may thus be divided in some embodiments into a domain address table and a virtual address table that respectively map domain addresses and virtual addresses to destination ports through which frames are to be forwarded.

Figure 2A:
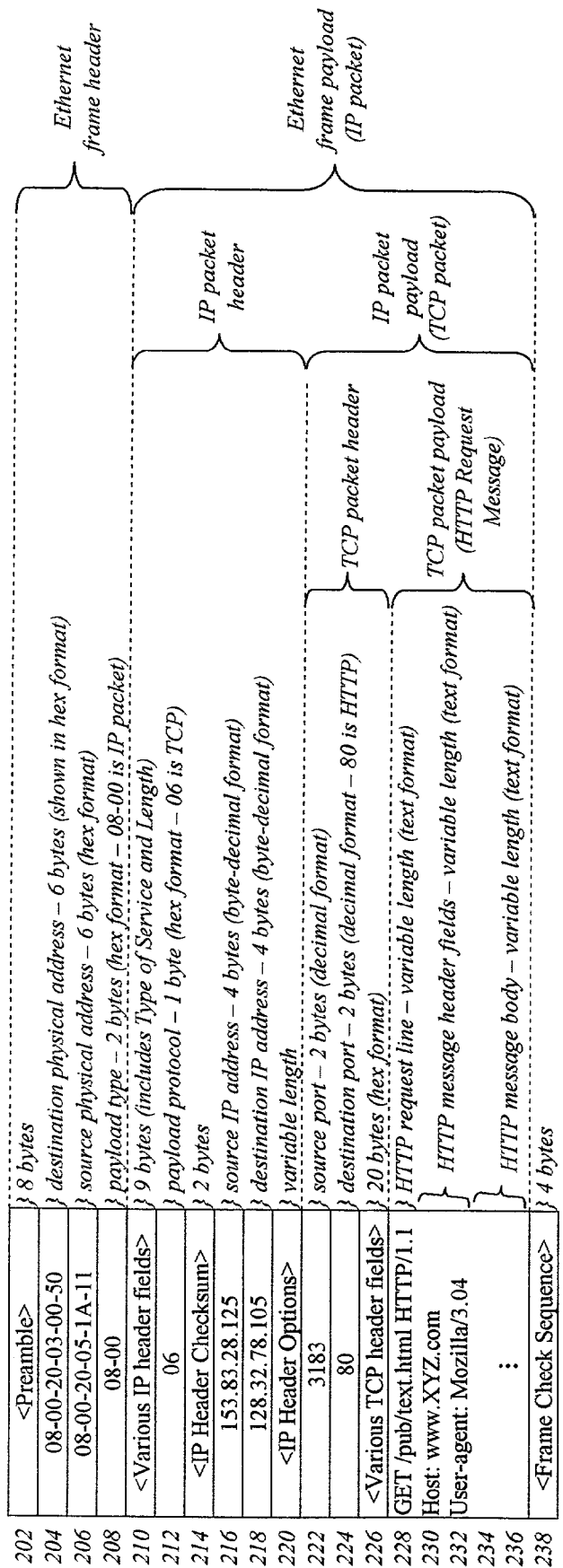

As an illustrative example of processing a data frame that is encoded using a first data link layer network protocol (i.e., layer 2 of the 7-layer ISO network model), FIG. 2A illustrates an incoming Ethernet-encoded data frame. Multiple processing techniques will be performed on the incoming data frame, and a new data frame will be constructed that corresponds to the incoming data frame but that is encoded using a second data link layer network protocol, as illustrated in FIG. 2B with an example outgoing Fibre Channel-encoded data frame. The Fibre Channel data frame can then be forwarded to a determined destination, such as by using a destination network address or a virtual identifier to route the Fibre Channel data frame to a node on a Fibre Channel network.

In the illustrated embodiment, the Ethernet data frame illustrated in FIG. 2A contains a payload that is an encapsulated TCP/IP packet whose payload includes an HTTP Request message. The header of the Ethernet data frame is illustrated in entries 202–208, and includes information such as a destination physical address (e.g., a MAC address) for the data frame, a source physical address, and a type of the Ethernet data frame payload. In this illustrated embodiment, the Ethernet data frame is being routed to an MPEX that connects two or more distinct Local Area Networks ("LANs") using different data link layer network protocols, and thus the destination physical address in entry 204 is the destination physical address for the MPEX on the Ethernet-based LAN from which the Ethernet data frame is received.

Upon receiving the Ethernet data frame, the MPEX performs various types of processing in an integrated manner before forwarding a corresponding data frame to a next (and possibly ultimate) destination on a different LAN to which the MPEX belongs that uses the Fibre Channel protocol. In particular, the MPEX in the illustrated embodiment first deconstructs the received Ethernet data frame in order to identify various information in the Ethernet data frame header and payload to be used for the processing. This deconstructing of the data frame is done in a manner specific to the Ethernet protocol, such as based on the knowledge that the payload type information is in the 21st and 22nd bytes of the data frame and that the payload information begins at byte 23 of the data frame. This deconstructing can be performed in various ways, such as by a general-purpose processor configured in an appropriate manner or instead by an appropriate network processor that is optimized to efficiently perform the deconstruction.

After the deconstruction of the received data frame is performed, the deconstructed data frame information can be used by various processing techniques in either a serial or parallel manner. Deconstructing the received data frame only once and then performing multiple processing techniques using the deconstructed information allows the processing to be performed quickly and efficiently, particularly in situations in which some or all of the techniques can be performed in parallel. In some embodiments, multiple general-purpose processors or other distinct processing capabilities are available to the MPEX (e.g., as part of a network processor), and if so each analysis technique could be performed in parallel on one of the distinct processing capabilities.

In the illustrated embodiment, the analysis techniques to be performed on the received data frame include classifying the type of content included in the data frame payload, analyzing the payload to determine whether any disallowed content types are present, selecting one or more of multiple possible destinations to which a corresponding data frame will be forwarded (e.g., to balance the load among those possible destinations), and constructing a new data frame based on the data link layer network protocol used by the network to which the selected destinations belong.

The content classification analysis is performed so as to determine the information that will be eventually supplied to a destination application, and thus corresponds to classification at layers 4–7 of the 7-layer ISO networking model. In the illustrated embodiment, the content classification analysis uses the payload type information included in entry 208 to determine that the Ethernet data frame payload is an IP packet. The content classification analysis then analyzes information in the IP packet header in entries 210–220, including the type of the protocol of the IP packet payload in entry 212. Upon determining that the IP packet payload is a TCP protocol-based packet, the content classification then analyzes various information in the TCP packet header in entries 222–226, including the destination software port address in entry 224. In the illustrated embodiment, the content classification analysis then determines that the payload of the TCP packet is likely to be an HTTP protocol-based message based on the use of the well-known port 80 for HTTP application layer (i.e., layer 7 of the 7-layer ISO model) protocol-based messages.

In some embodiments, the content type classification may end after determining that the application layer type of content is an HTTP message, while in the illustrated embodiment the analysis technique continues to analyze the TCP packet payload in entries 228–236 in a manner specific to the application layer protocol used to encode the TCP packet payload. For example, by analyzing the first line of the HTTP message illustrated in entry 228, the content classification technique can determine that the HTTP message is a Request message (i.e., by the presence of the "GET" command). In addition, various other types of information can be determined, such as the specific Uniform Resource Identifier ("URI") requested by the message. In the illustrated message, such analysis involves combining the Host HTTP message header field value "www.XYZ.com" in entry 230 with the path portion of the URI after the "GET" command in entry 228 to form a requested URI of "http://www.XYZ.com/pub/text.html". Those skilled in the art will appreciate that other types of information may be of interest for HTTP messages, such as the presence or values of other HTTP message header fields or information in an HTTP message body, and that information encoded using other application layer protocols (e.g., telnet, FTP, SMTP, DNS, NFS, etc.) and other types of data (e.g., video data or streaming audio data) can similarly be analyzed in a manner specific to that application layer protocol or type of data.

The information obtained from the content type classification can then be used in various ways, such as to assist other processing techniques that are performed after the content classification and/or to assist in determining a manner of transmitting the corresponding data frame to a selected destination (e.g., specifying minimum Quality of Service ("QoS") parameters for video data or preempting an existing connection to a selected destination for a high priority type of request or response).

In addition to classifying the content type of the Ethernet data frame payload, the deconstructed data frame information can also be analyzed in various other ways, such as to detect the presence or absence of required or prohibited content in the payload. In some embodiments, a content analysis technique provides firewall capabilities in which prohibited types of data are prevented from entering a destination network. For example, the firewall may block data frames based on a high-level source and/or or destination network address specified in the payload, such as the source and destination IP addresses in entries 216 and 218 of the IP packet header. In addition, the payload of the Ethernet data frame, IP packet and/or TCP packet could also be analyzed to the detect the presence or absence of specified information (e.g., strings of characters that match a specified pattern). If higher-level information is available from the content type classification analysis, the content analysis techniques could additionally use such information to perform more sophisticated analysis. For example, a firewall could prohibit only certain types of messages, such as all FTP traffic, all HTTP Request (but not Response) messages, or messages that specify certain URIs.

If the content analysis techniques identify the presence of prohibited information, a variety of responses could be performed, such as to prevent the forwarding of a corresponding data frame to a selected destination that corresponds to the destination IP address indicated in entry 218, or to instead modify or remove the prohibited content (e.g., any executable code or an attached file of a specified type). In a similar manner, if required content is not present, the content analysis techniques could similarly prevent the forwarding of a corresponding data frame or instead add the required content (e.g., a confidentiality notice at the end of outgoing e-mail) to the corresponding data frame before forwarding.

The deconstructed data frame information can also be analyzed to determine an appropriate destination to which a corresponding data frame will be forwarded. In some embodiments, the destination determination will be performed after the content type classification and/or the content analysis, such as to eliminate the need to perform the processing if the forwarding of the corresponding data frame is to be prevented or to use information provided by the other techniques to assist in the determination of an appropriate destination. In some embodiments, the destination selection analysis merely uses specified logical destination network address information (e.g., the destination IP address specified in entry 218) and determines a single node that corresponds to that destination network address on one of the networks to which the MPEX belongs. In other embodiments, more sophisticated analysis is performed, such as to load balance multiple alternative nodes that correspond to the indicated destination network address and/or to select one or more destinations based on other information from the deconstructed data frame, such as a type of data (e.g., video data) or type of application layer protocol information (e.g., FTP or HTTP) included in the received data frame. If the content type classification analysis further provides information specific to the type of content (e.g., the specific URI requested in an HTTP Request message), such information can similarly be used in selecting the destination.

The deconstructed data frame information can also be used to construct a new data frame that corresponds to the received data frame, such as by a protocol translation technique that constructs a new data frame encoded using a different data link layer network protocol than that of the deconstructed data frame. Such data frame construction processing allows the MPEX in the illustrated embodiment to act as a gateway that bridges networks using Ethernet and Fibre Channel network protocols. If information is available from the content type classification, content analysis and/or destination selection analysis techniques, such information can be incorporated in the new data frame as it is constructed. Alternatively, if the construction of the new data frame occurs before those other analysis techniques have completed (e.g., if performed in parallel with the other techniques), relevant information can be added to the newly-constructed data frame after the completion of those techniques, such as to add a high-level destination network address for the selected destination.

FIG. 2B illustrates an example of a newly-constructed Fibre Channel-based data frame that corresponds to the deconstructed Ethernet data frame. In particular, in the illustrated embodiment a destination has been selected on a Fibre Channel-based network to which the MPEX belongs, and an indication of the destination has been placed in entry 256 of the new data frame, which is defined to hold the physical address of the destination hardware port on the node to receive the data frame. As described above, however, in some embodiments the MPEX uses a destination physical address in entry 256, while in other embodiments a virtual identifier that is not associated with a destination (e.g., that is associated with a path through the network from the MPEX to the destination) is instead specified in entry 256. Various other information is specified in entries 252–264 that correspond to the header of the data frame, including Class Specific Control information specified in entry 258 of the new data frame that affects the manner in which the data frame will be transmitted with transmission priority information and preemption information related to existing dedicated connections. In the illustrated embodiment, the payload of the new data frame is specified in a manner similar to that of the payload of the received Ethernet data frame, with the TCP/IP packet information encapsulated in the payload. As previously noted, however, in other situations payloads may be altered for various reasons, such as in response to modifications performed by the content analysis techniques. After constructing the new data frame and if no indications are received to prevent its forwarding, the newly-constructed data frame is then forwarded along the Fibre Channel-based network to the selected destination. Before performing the forwarding, an additional step may be performed in some embodiments of registering the newly constructed data frame with a network manager for the Fibre Channel-based network, such as to determine an appropriate virtual identifier to be used for the transmitting of the data frame and/or to assist in selecting one or more appropriate destinations for the data frame.

Figure 3A:
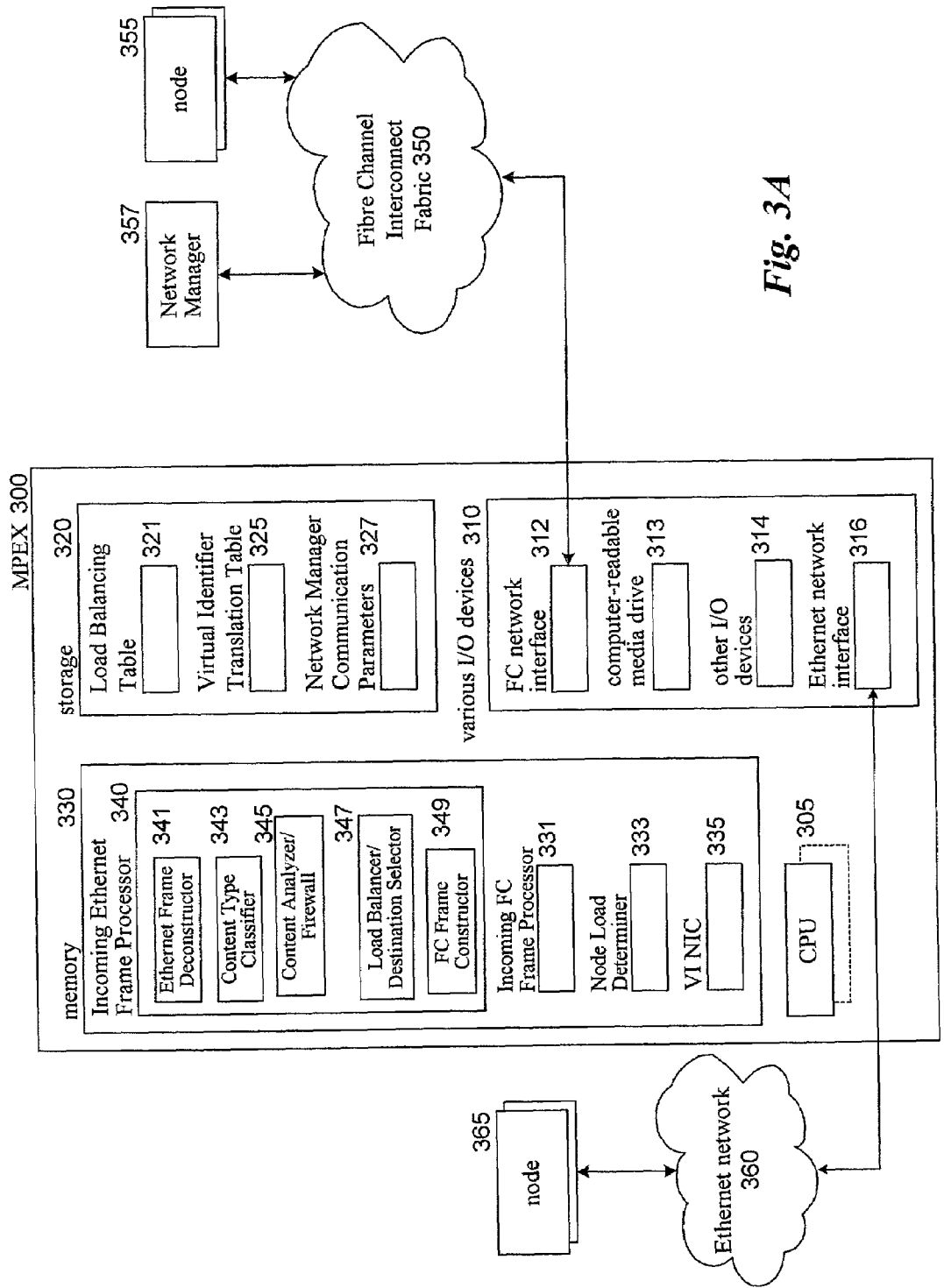
FIG. 3A is a block diagram illustrating an embodiment of a Multi-Protocol Edge Switch that integrates multiple disparate data communication processing techniques.

FIG. 3A is a block diagram illustrating an embodiment of an MPEX computing device 300 suitable for performing the data frame deconstruction and integrated data communication processing techniques discussed, and also illustrates various node computing devices 355 and 365 with which the MPEX can inter-communicate. The illustrated MPEX belongs to a Fibre Channel-based Interconnect Fabric network 350 that includes the nodes 355 and a Network Manager 357, and also belongs to a Ethernet-based network 360 to which the nodes 365 belong.

The illustrated embodiment of the MPEX includes one or more CPUs 305, various I/O devices 310, storage 320 and memory 330. The I/O devices include a Fibre Channel network interface 312 which connects the MPEX to the Interconnect Fabric, an Ethernet network interface 316 that connects the MPEX to the Ethernet network, a computer-readable media drive 313, and various other I/O devices 314. An embodiment of an Incoming Ethernet Frame Processor component 340 and an embodiment of an Incoming Fibre Channel Frame Processor component 331 are executing in memory, as are an optional Node Load Determiner component 333 and an optional VI NIC component 335. While the Frame Processor components 331 and 340 in the illustrated embodiment include components executing in the main memory of the node, those skilled in the art will appreciate that other arrangements are possible in other embodiments, such as implementing a Frame Processor component together with a corresponding network interface on a single plug-in card that can be added to an MPEX, with the plug-in card providing stand-alone memory and/or various processing capabilities including hard-wired logic.

In the illustrated embodiment, the Incoming Ethernet Frame Processor component contains various sub-components that include an Ethernet Frame Deconstructor 341, a Content Type Classifier 343, a Content Analyzer 345 with firewall capabilities, a Destination Selector 347 with load balancing capabilities, and a Fibre Channel Frame Constructor 349. In the illustrated embodiment, when one of the nodes 365 on the Ethernet network sends a communication that is received by the Ethernet network interface and is destined for one of the nodes 355 on the Interconnect Fabric network, the Incoming Ethernet Frame Processor is notified of the received data frame. In response, the Ethernet Frame Deconstructor deconstructs the received data frame to identify the payload of the data frame and various information in the data frame header. This deconstructed data frame information is then made available to the other sub-components 343–349. The Content Type Classifier, Content Analyzer, Destination Selector, and Fibre Channel Frame Constructor sub-components then process the deconstructed data frame information in various ways, either serially or in parallel.

If the MPEX includes multiple CPUs, for example, each of the analysis techniques could be performed on a different CPU. One of or more of the sub-components may also use various accessible information in performing their analyses. For example, the Destination Selector component 347 in the illustrated embodiment determines the destination IP address specified in the incoming Ethernet data frame and determines if that IP address corresponds to multiple alternative destination nodes 355 able to receive and respond to the data frame. In the illustrated embodiment, a Load Balancing Table 321 is present on storage 320, and it maps specified destination IP addresses to multiple alternative destination IP addresses which can be used in place of the specified destination IP address. In some embodiments, the Load Balancing Table may also contain various load information for some or all of the nodes corresponding to the alternative destination IP addresses (e.g., response times or other indications of processing load), such as if the Node Load Determiner component obtains such load information for some or all of the nodes 355 (e.g., from the nodes or from the Network Manager) and stores that information in the Load Balancing Table.

Those skilled in the art will appreciate that the Incoming Fibre Channel Frame Processor can in some embodiments have the same sub-components as does the Incoming Ethernet Frame Processor, and if so will process data frames received from nodes 355 in a corresponding manner. Alternatively, in other embodiments incoming data frames from the Fibre Channel Interconnect Fabric network may be processed in a distinct manner, such as if the data frames are deconstructed and translated to data frames using an alternative data link layer network protocol without performing additional analysis such as content type classification, content analysis, and/or load balancing.

In addition, in some embodiments the MPEX includes an optional VI NIC component to assist in routing incoming Ethernet data frames to appropriate destination nodes 355 in an appropriate manner as previously discussed. If so, the VI NIC can register some or all of the incoming Ethernet data frames with the Network Manager, such as by supplying information about the selected destination IP address and/or or an indication of the type of date being communicated (e.g., from the content type classification), and can receive in response an appropriate transmittal virtual identifier to use to transmit the corresponding newly constructed Fibre Channel-based data frame to one or more appropriate destination nodes 355. The VI NIC may use Network Manager communication parameters 327 on storage to communicate with the Network Manager, and may store mappings from selected destination IP addresses (as well as destination application software port numbers) and/or data type information to corresponding virtual identifiers in the Virtual Identifier Translation Table 325 on storage, such as for use with additional received data frames that are part of the same or a similar data communication.

Those skilled in the art will appreciate that MPEX 300 is merely illustrative and is not intended to limit the scope of the present invention. The MPEX may be connected to other devices that are not illustrated, including one or more additional networks (e.g., that are part of the Internet). In addition, the MPEX could be part of an EDN, such as by connecting a storage area network of the EDN to another part of the EDN. Those skilled in the art will also appreciate that the functionality provided by the illustrated Frame Processor components may in some embodiments be combined in fewer components or distributed in additional components. Similarly, in some embodiments, the functionality of some of the illustrated components may be not be provided and/or other additional functionality may be available, such as selecting destinations in a manner other than or in addition to load balancing.

Those skilled in the art will also appreciate that, while various items are illustrated as being stored in memory while being used, those items or portions of them can be transferred between memory and other storage devices for purposes of memory management and data integrity. Similarly, items illustrated as being present on storage while being used can instead be present in memory and transferred between storage and memory. Some or all of the components and data structures may also be stored (e.g., as instructions or structured data) on a computer-readable medium, such as a hard drive, a memory, a network, or a portable article to be read by an appropriate drive. The components and data structures can also be transmitted as generated data signals (e.g., as part of a carrier wave on a variety of computer-readable transmission mediums, including wireless-based and wired/cable-based mediums). Accordingly, the present invention may be practiced with other computer system configurations.

Figure 3B:
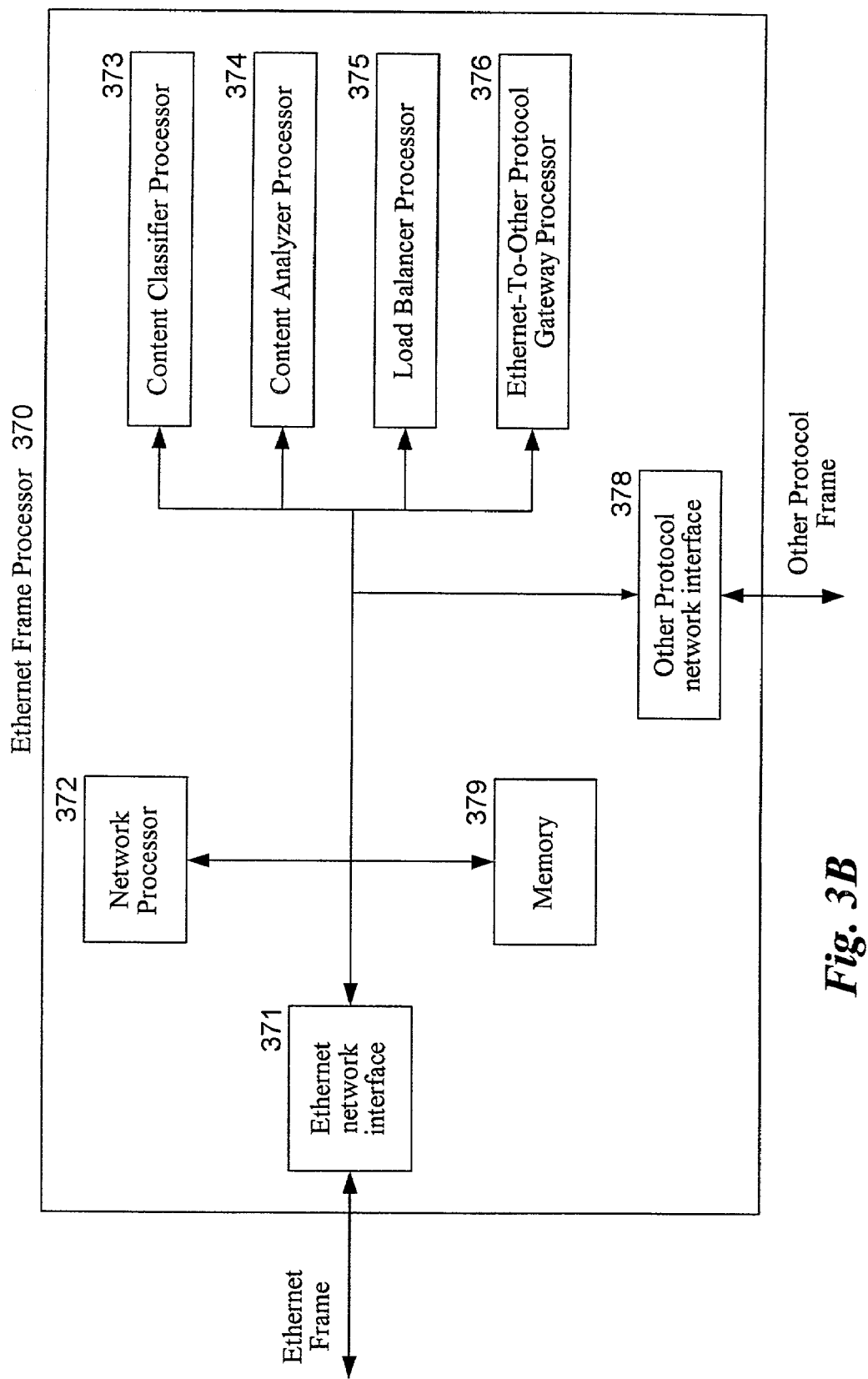
FIG. 3B is a block diagram illustrating an embodiment of a component that integrates multiple disparate data communication processing techniques.

FIG. 3B is a block diagram illustrating an alternative embodiment of an Ethernet Frame Processor component 370 that includes various dedicated hardware to assist in the integrated multi-technique processing of a received Ethernet data frame. The illustrated Ethernet Frame Processor could be used in place of the software component 340 and the network interface 316 illustrated in FIG. 3A, such as by being implemented as a plug-in card that is part of the MPEX. In other embodiments, the Ethernet Frame Processor could act as a stand-alone device that provides protocol translation back-and-forth between Ethernet and another networking protocol and that optionally performs other types processing on received data frames encoded in one or both protocols.

In the illustrated embodiment, the Ethernet Frame Processor 370 includes an Ethernet network interface 371 that can receive and transmit Ethernet frames. When an Ethernet frame is received, the Network Processor 372 receives the data frame from the network interface and deconstructs the data frame in a manner specific to the Ethernet protocol, such as by using specialized hardware components to provide accelerated deconstruction. The Network Processor then provides deconstructed data frame information to various processors 373–376 for analysis of the information. These processors may be general-purpose processors programmed in specific manners or may instead by hardware specialized for the various analysis tasks, and may perform their analysis techniques either in parallel or in a serial manner.

In particular, the Content Classifier Processor 373 will classify the type of content of the deconstructed data frame, the Content Analyzer Processor 374 will analyze the content of the deconstructed data frame such as to provide firewall capabilities, the Load Balancer Processor component 375 will provide load balancing and/or other destination selection capabilities, and the Ethernet-To-Other Protocol Gateway Processor 376 will construct a data frame specific to a non-Ethernet data link layer network protocol that corresponds to the received Ethernet data frame. The Ethernet Frame Processor 370 also includes memory 379, which may be used by one or more of the processors 372–376 when performing their tasks. For example, the Load Balancer Processor 375 may store load balancing information in the memory. Alternatively, one or more of the processors 372–376 may communicate with external resources (e.g., memory or storage) in order to obtain necessary information.

The Ethernet Frame Processor 370 additionally includes a network interface 378 that is specific to a data link layer network protocol other than Ethernet. For example, the network interface 378 may be a Fibre Channel network interface, and if so the Gateway Processor 376 would produce a Fibre Channel-based data frame for transmittal to a selected destination. Alternatively, the Ethernet Frame Processor could be one of multiple Frame Processors that interact, and the network interface 378 may correspond to an intermediate protocol common to all of the Frame Processors (e.g., PCI or InfiniBand). In such an embodiment, a new data frame could be constructed in that intermediate format, and could be forwarded to a different Frame Processor component that receives the data frame on a network interface for that intermediate format and converts the data frame to a non-Ethernet data link layer network protocol (e.g., Fibre Channel) before forwarding the converted data frame to a destination on a distinct network to which another network interface of that Frame Processor is connected. In such embodiments, each of the Frame Processors would have the capability to process data frames received over either of the network interfaces for that Frame Processor.

Those skilled in the art will appreciate that the various sub-components of the Ethernet Frame Processor 370 can communicate in various ways, such as with a PCI or InfiniBand-based bus. Similarly, in other embodiments the illustrated Frame Processor could include additional functionality (e.g., Node Load Determination capabilities and/or VI NIC capabilities), and/or could be used as a stand-alone MPEX.

Figure 3C:
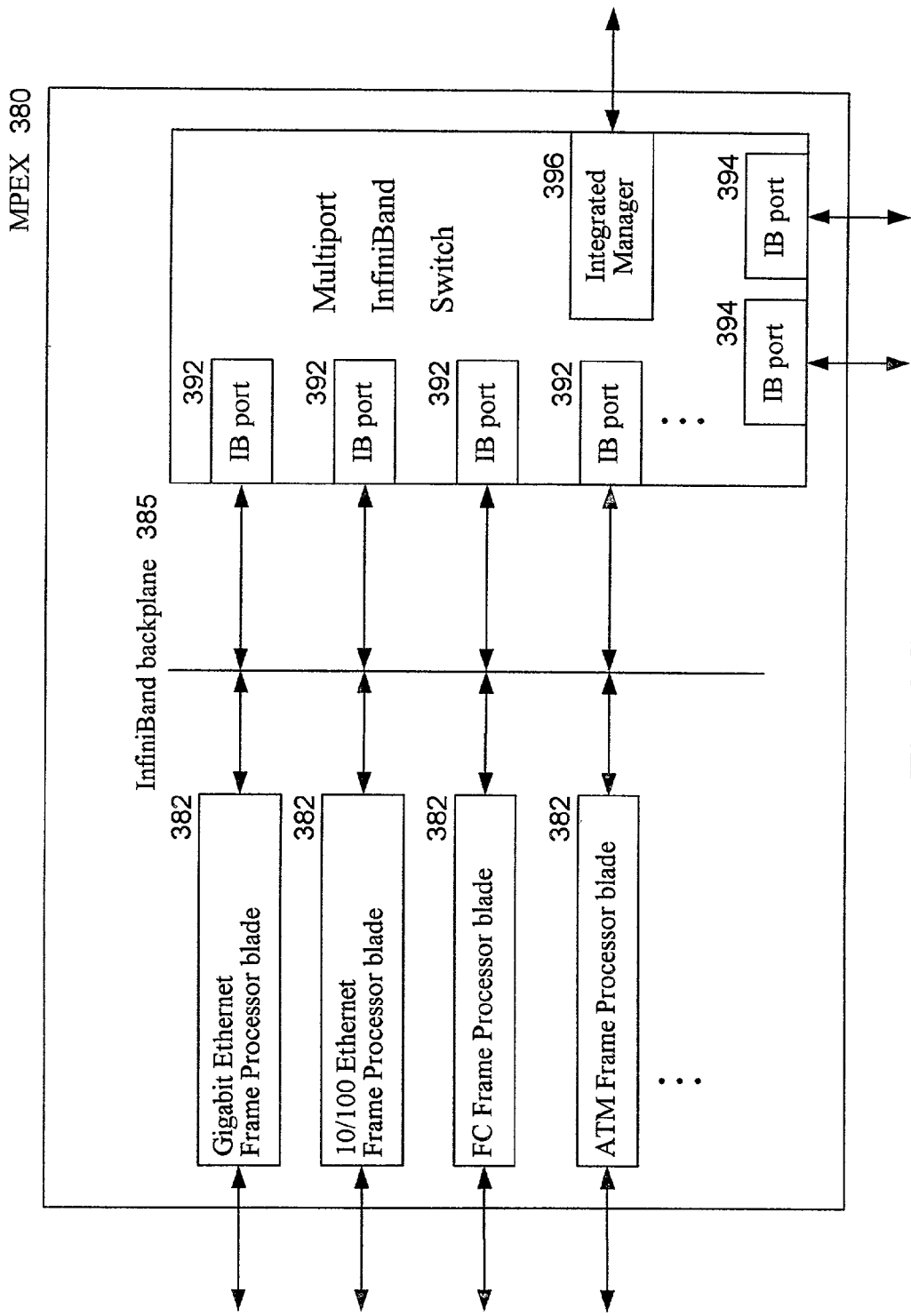
FIG. 3C is a block diagram illustrating an alternative embodiment of a Multi-Protocol Edge Switch that integrates multiple disparate data communication processing techniques.

FIG. 3C is a block diagram illustrating an alternative embodiment of an MPEX 380 that integrates multiple disparate data communication processing techniques. In particular, the illustrated embodiment of the MPEX contains multiple Frame Processors that are each specific to a data link layer network protocol for a network to which they are connected, and the Frame Processors each perform various types of processing techniques on incoming data frames and convert those data frames to a common intermediate format (which in the illustrated embodiment is InfiniBand). Each of the Frame Processors in the illustrated embodiment are blades that connect to an InfiniBand backplane 385, with each of the blade slots connecting to a corresponding InfiniBand port 392 on a multi-port InfiniBand switch 390. The switch will route each InfiniBand data communication received on an incoming InfiniBand port 392 to an appropriate outgoing InfiniBand port 392 that corresponds to a Frame Processor blade connected to a network to which the destination of the received data communication belongs. In the illustrated embodiment, the switch 390 additionally includes an Integrated Manager component 396 to perform various administrative and management functions, as well as one or more additional InfiniBand ports 394 for other external communications.

Figure 4:
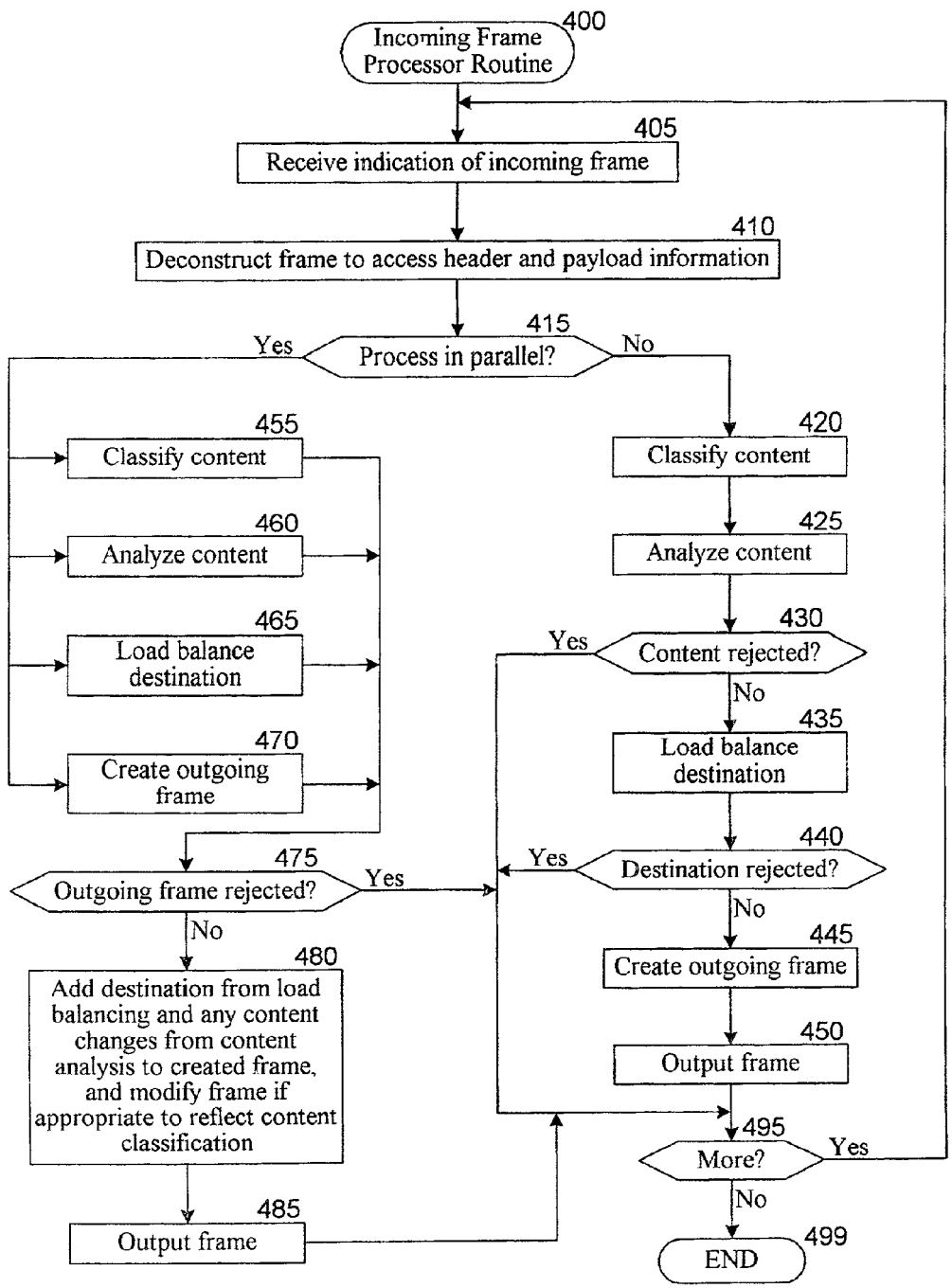
FIG. 4 is a flow diagram of an embodiment of an Incoming Frame Processor routine.

FIG. 4 is a flow diagram of an embodiment of the Incoming Frame Processor routine 400. The routine receives indications of incoming data frames in one or more data link layer network protocols, deconstructs those frames to obtain payload and header information in a manner specific to the data link layer network protocol in which the data frames are encoded, analyzes the deconstructed data frame information in various ways, and creates and transmits a corresponding data frame encoded in a different data link layer network protocol for forwarding if appropriate.

The routine begins with step 405 where an indication is received of an incoming data frame. The routine continues to step 410 to deconstruct the data frame to access information from the header and payload portions of the data frame. In step 415, the routine then determines whether to perform various analysis techniques in parallel or in serial, such as based on a dynamic indication for that received data frame or instead on a type of data link layer network protocol corresponding to some or all of the received data frames.

If the processing is not to be performed in parallel, the routine continues to step 420 to perform processing to classify the type of content of the payload of the data frame. The routine then continues to step 425 to analyze the payload of the data frame for various types of required or prohibited content, and may in some embodiments use content type classification information from step 420 as part of the analysis. In some embodiments, if prohibited content is detected and/or required content is not present, the content analysis may remove, replace, or add such content. Alternatively, in other embodiments the presence or absence of such information may cause the content analysis techniques to indicate that the content has been rejected. If it is determined in step 430 that the content analysis techniques have indicated to reject the content, the routine continues to step 495, and if not continues to step 435.

In step 435, the destination of the data frame is selected by performing load balancing techniques on the destination network address specified for the incoming data frame. In some embodiments, content type classification information from step 420 and/or content analysis information from step 425 may be used to assist in the destination selection process, such as to select a destination optimized for the specific content of the received data frame or based on information determined during the analysis of the content. In some embodiments, the destination selection techniques in step 435 may determine that no destination is currently appropriate to receive the data frame. If in step 440 it is so determined, the routine continues to step 495, and if not the routine continues to step 445 to create a new data frame that corresponds to the received data frame but that is specific to a new data link layer network protocol for the network to which the selected destination belongs. Information from some or all of the content type classification, content analysis, and destination selection processing may be used in the creation of the new data frame, such as to add a destination network address for a selected destination, specify a manner of transmittal of the new data frame based on a classified type of content or content analysis, or to modify the payload of the new data frame based on changes made by the content analysis processing. After step 445, the routine continues to step 450 to output the frame, such as to send the frame to a network interface for the network to which the destination belongs. In alternative embodiments, the frame may be output to other components for additional processing before transmittal, such as to a VI NIC. After step 450, the routine continues to step 495 to determine if there are more data frames to receive. If so, the routine returns to step 405, and if not the routine continues to step 499 and ends.

If it was instead determined in step 415 to process the deconstructed data frame information in parallel, the routine continues to perform steps 455, 460, 465 and 470 in parallel, such as on distinct processors or as distinct processes on a multitasking system. After steps 455, 460, 465, and 470, the routine continues to step 475 to determine if any of the processing indicated to reject the transmittal of the created outgoing frame (e.g., based on the content analysis or the load balancing), and if so the routine continues to step 495. If the outgoing frame was not rejected, the routine instead continues to step 480 to combine any information from the processing in steps 455, 460 and 465 to the frame created in step 470 as appropriate. The routine then continues to step 485 to output the frame in a manner similar to that of step 450, and continues to step 495.

Those skilled in the art will appreciate that in other embodiments some of the types of deconstructed data frame information processing may not be performed, or that instead additional types of processing may be performed either in parallel or in serial. In addition, those skilled in the art will appreciate that a mix of serial and parallel processing can be performed for some or all of the received data frames, such as to perform the content type classification first, to perform the content analysis and load balancing in parallel next, and to then create an appropriate outgoing frame in a manner similar to that indicated for step 480. In addition, in embodiments in which the processing is performed in a serial manner, those skilled in the art will appreciate that in other embodiments the processing may be performed in other orders, and that steps illustrated as being earlier in the routine in the illustrated embodiment (e.g., the content type classification) may use information provided by other analysis techniques shown in the illustrated embodiment as being processed later (e.g., content analysis).

The processing of received data communications and the use of virtual identifiers as discussed above and in the previously cited U.S. Patent Applications also provides various other benefits. For example, the discussed techniques allow a communication model to be used in which data to be transmitted is identified in some embodiments by its type, which can be determined in various ways, and in which the transmission of the data can then be suited to that data type. For example, in some embodiments one or more destinations can be selected that are appropriate to that data type, such as by using one or more virtual identifiers that correspond to that data type. Similarly, in some embodiments one or more QOS parameters can be selected to be used during the data transmission that are appropriate to that data type. Moreover, the use of virtual identifiers allows the routing of the data using that virtual identifier to be reconfigured in a manner transparent to the source and destination (e.g., by modifying a path to which that virtual identifier corresponds), such as to maintain a QOS for that data type. Moreover, the registering of data to be transmitted, such as registrations that include the type of data, allow a network manager for the network to provide various monitoring and configuration services. Those skilled in the art will appreciate that these various techniques can be combined in any logical combination.

The discussed techniques also allow a QOS model to be used in some embodiments so that various types of QOS guarantees can be provided, such as to bandwidth, latency, jitter, and/or availability. The use of configurable label tables by switches allows a network manager to control how many and which communications will pass through each link on each switch, and thus the network manager can ensure that sufficient bandwidth is available for a communication by limiting the other communications that use any of the same links. The network traffic can also be monitored so that allocations of communications to links can be adjusted as needed. This allows guaranteed bandwidth for virtual connections in which a dedicated physical connection is not used. In addition, hunt groups between switches can also be used to provide a minimum level of bandwidth by providing alternative paths for communications. The transmission priority assigned to data communications can be used to control how quickly those communications pass through intermediate routing devices, and thus can be used to control both latency and jitter. In addition, varying the COS assigned to data communications allows guarantees to be made as to delivery, and can also be used to affect latency and jitter if different COSes are given different priorities by intermediate routing devices. Finally, the management of paths assigned to virtual identifiers, both initially and during reconfiguration based on monitoring, allows guarantees to be made for various QOS parameters. Those skilled in the art will appreciate that these various techniques can be combined in any logical combination.

The discussed techniques also allow a security model to be used in some embodiments to provide various types and levels of security. The use of virtual addressing restricts a node so that it is able to communicate only with those destination nodes for which the SPC's label table on the node's corresponding switch port has valid virtual address and to which that switch port will route communications. Moreover, the node may not even know actual physical addresses or even the identity of the destinations that correspond to the virtual addresses, and other nodes cannot make use of those virtual addresses to communicate with the same destinations unless the SPC label table on that other node's corresponding switch port has been configured in a like manner. In addition, for data communication registrations, a network manager can require that a node supply various types of authorization information (e.g., a password) supplied to that node earlier (e.g., during registration of the node or during manufacture of the node). In addition, the requirement for a node to register with the network manager before it can make any other communications allows the network manager to monitor and control data communications through the network, particularly in combination with data communication registrations. In addition, a VI NIC's and/or intermediate routing device's ability to verify that combinations of transmittal and response virtual identifiers are valid and to verify that specified QOS parameters are authorized for those virtual identifiers provides various security benefits. When integrated managers for intermediate routing devices inter-communicate (e.g., for remote management of that integrated manager or its corresponding switch), or for any other communication to an integrated manager, various password or other identity verification or authorization verification schemes can be used to ensure that received communications and commands are valid and authorized. Those skilled in the art will appreciate that these various techniques can be combined in any logical combination.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims. In addition, while certain aspects of the invention are presented below in certain claim forms, the inventors contemplate the various aspects of the invention in any available claim form. For example, while only one some aspects of the invention may currently be recited as being embodied in a computer-readable medium, other aspects may likewise be so embodied. Accordingly, the inventors reserve the right to add additional claims after filing the application to pursue such additional claim forms for other aspects of the invention.

What is claimed is:

1. A method for a multi-protocol edge switch to process received data frames, the edge switch connected to at least two networks that each use distinct data link layer network protocols, the method comprising:

receiving multiple data frames transmitted from source nodes on a first of the networks that uses a first data link layer network protocol, each data frame comprising a header and a payload specified in a manner specific to the first data link layer network protocol, each header including an indication of a destination network address corresponding to a node on a second of the networks and each payload including a message specified using an application layer network protocol; and for each of the multiple received data frames,
deconstructing the data frame to identify the indicated destination network address and the payload for the data frame, the deconstructing performed in a manner based on the first data link layer network protocol;

without deconstructing the data frame a second time, processing the deconstructed data frame by performing each of multiple processing techniques in parallel, the multiple processing techniques including,
analyzing the identified payload in order to determine a type of the included message, the analyzing performed in a manner based on the application layer network protocol used to specify the included message;
analyzing the identified payload to verify an absence of disallowed content;
selecting one of multiple nodes of the second network to which the identified destination network address corresponds, the multiple nodes associated with the identified destination network address, the selecting performed so as to balance processing loads on the multiple nodes; and
constructing a distinct data frame for transmission to the selected one node, the distinct data frame comprising a header and the identified payload and specified in a manner specific to the data link layer network protocol used by the second network; and
transmitting the constructed distinct data frame to the selected one node on the second network, so that each of the received data frames can be processed in multiple ways in parallel based on a single deconstruction of the data frame before transmitting the payload of the data frame to a destination node.

2. The method of claim 1 wherein the multiple processing techniques are each performed using distinct processing capabilities of the multi-protocol edge switch.

3. The method of claim 2 wherein the distinct processing capabilities are distinct processors of the multi-protocol edge switch.

4. The method of claim 1 including, before the transmitting of the constructed data frame, modifying the constructed data frame based on information generated during the analyzing of the identified payload to determine the type of the included message, the analyzing of the identified payload to verify the absence of disallowed content, and the selecting of the one node.

5. The method of claim 1 wherein the transmitting of each of the constructed data frames is performed in a manner based on one or more of the analyzing of the identified payload to determine the type of the included message, the analyzing of the identified payload to verify the absence of disallowed content, and the selecting of the one node.

6. The method of claim 1 wherein the data link layer network protocol used by one of the networks is an Ethernet protocol.

7. The method of claim 1 wherein the data link layer network protocol used by one of the networks is a Fibre Channel protocol.

8. The method of claim 1 wherein the data link layer network protocol used by one of the networks is an InfiniBand protocol.

9. The method of claim 1 wherein the deconstructing of each of the data frames is performed by a network processor of the multi-protocol edge switch.

10. The method of claim 1 wherein the deconstructing of each of the data frames further identifies a type of the identified payload, and wherein one or more of the processing techniques are performed in a manner based at least in part on the identified type of the identified payload.

11. The method of claim 1 wherein the message included in at least some of the identified payloads is an HTTP message, and wherein the analyzing of each of those payloads to determine the type of the included message includes identifying a Uniform Resource Identifier specified in the message.

12. The method of claim 1 wherein the analyzing of the identified payload of each of the received data frames includes extracting contents of the message included in that payload in a manner based on the application layer network protocol used to specify the message.

13. The method of claim 1 wherein the transmitting of a constructed distinct data frame for a received data frame is not performed if the analyzing of the identified payload of the received data frame to verify an absence of disallowed content fails to verify the absence.

14. The method of claim 1 wherein the transmitting of a constructed distinct data frame for a received data frame is not performed if the selecting of the one of the multiple nodes is unable to sufficiently balance the processing loads on the multiple nodes.

15. The method of claim 1 including, for each of the received data frames, adding to the header of the constructed data frame an indication of a second destination network address corresponding to the selected one node, the second destination network address distinct from the destination network address identified for that received data frame.

16. The method of claim 1 including, for each of the received data frames, determining a transmittal virtual path identifier that is assigned to a path to the selected one node through the second network to which that node belongs, and wherein the transmitting of the constructed distinct data frame to the selected one node on the second network uses the determined transmittal virtual path identifier so that the data frame is routed through the second network along the path.

17. The method of claim 16 wherein, for each of the received data frames, the determined transmittal virtual path identifier is added to the header of the distinct data frame in place of a destination network address for the selected one node.

18. The method of claim 16 wherein the determining of the transmittal virtual path identifier that is assigned to the path to the selected one node for a received data frame includes registering with a network manager for the second network to which the selected one node belongs and receiving in response the transmittal virtual path identifier.

19. A computer-implemented method for processing received data communications, the method comprising:
receiving data to be communicated through a network to a destination, the received data formatted in accordance with a first protocol; and
processing at least portions of the received data that are identified as relevant by performing each of multiple techniques in parallel, the multiple techniques including,
analyzing contents included in at least some of the identified portions in order to determine whether a specified type of content is present; and
determining the destination for the received data in a manner so as to load balance multiple possible destinations wherein the analyzing of the contents included in the identified portion includes determining whether at least some of the identified portion include prohibited content; when it is determined that one or more of the identified portions include prohibited content, removing the prohibited content from the received data.

20. The method of claim 19 including communicating the received data to the determined destination.

21. The method of claim 19 including determining a virtual identifier that corresponds to a path through the network to the determined destination and that will be used to route the received data through the network to the determined destination.

22. The method of claim 19 wherein the portions of the received data to be processed are identified by deconstructing the received data.

23. The method of claim 22 wherein the deconstructing of the received data is performed in a manner based on the first protocol.

24. The method of claim 22 wherein the deconstructing of the received data is performed only a single time.

25. The method of claim 19 wherein the first protocol is a data link layer network protocol.

26. The method of claim 19 wherein the first protocol is a network layer network protocol.

27. The method of claim 19 wherein the first protocol is a transport layer network protocol.

28. The method of claim 19 wherein the first protocol is an application layer network protocol.

29. The method of claim 19 wherein the first protocol is a bus protocol.

30. The method of claim 19 wherein the first protocol is Fibre Channel.

31. The method of claim 19 wherein the first protocol is InfiniBand.

32. The method of claim 19 wherein the received data is a data frame or a data packet, and wherein the identified portions of the received data include a header portion of the received data.

33. The method of claim 19 wherein the received data is a data frame or a data packet, and wherein the identified portions of the received data include a payload portion of the received data.

34. The method of claim 19 wherein the identified portions of the received data include entries in a header portion of the received data.

35. The method of claim 19 wherein the identified portions of the received data include portions of a payload of the received data.

36. The method of claim 19 including blocking transmittal of the received data when it is determined that one or more of the identified portions include prohibited content.

37. The method of claim 19 wherein the analyzing of the contents included in the identified portions includes determining whether at least some of the identified portions do not include required content.

38. The method of claim 19 including providing firewall functionality based on the analyzing of the contents included in the identified portions.

39. The method of claim 19 wherein the multiple techniques performed in parallel further include formatting the received data in accordance with a distinct second protocol.

40. The method of claim 19 wherein the multiple techniques performed in parallel further include analyzing at least some of the identified portions in order to classify a type of those portions of the received data.

41. The method of claim 40 wherein the classifying of the type of the identified portions of the received data includes classifying those identified portions in a manner based on an application layer protocol used to format the data of those identified portions.

42. The method of claim 19 wherein the method is performed by a multi-protocol edge switch connected to at least two networks that each use distinct protocols.

43. The method of claim 19 wherein the multiple processing techniques are each performed using distinct processing capabilities of a computing system performing the method.

44. The method of claim 43 wherein the distinct processing capabilities are distinct processors of the computing system.

45. A computer-readable medium whose contents cause a computing device to process received data communications by performing a method comprising:
receiving data to be communicated through a network to a destination; and
processing at least portions of the received data that are identified as being of interest by performing each of multiple techniques in parallel, the multiple techniques including,
determining whether a disallowed type of content is present in at least some of the identified portions of the received data; and
load balancing multiple possible destinations in order to determine the destination to which the received data will be transmitted wherein the multiple techniques performed in parallel further include formatting the received date in accordance with a second protocol distinct from a first protocol in accordance with which the received data is formatted.

46. The computer-readable medium of claim 45 wherein the multiple techniques performed in parallel further include classifying a type of at least some of the identified portions of the received data.

47. The computer-readable medium of claim 45 wherein the method further comprises indicating to communicate the received data to the determined destination.

48. The computer-readable medium of claim 45 wherein the portions of the received data to be processed are identified by deconstructing the received data a single time, each of the multiple techniques using the deconstructed received data.

49. The computer-readable medium of claim 45 wherein the computer-readable medium is a memory of a computer system.

50. The computer-readable medium of claim 45 wherein the computer-readable medium is a data transmission medium transmitting a generated data signal containing the contents.

51. The computer-readable medium of claim 45 wherein the contents are instructions that when executed cause the computing device to perform the method.

52. A computing device for processing received data communications, comprising:
  a first component capable of receiving data to be communicated through a network to a destination; and
  multiple processing components each capable of performing one of multiple techniques in parallel in order to process at least portions of the received data, the multiple techniques including,
    analyzing contents included in at least some of the identified portions in order to determine whether a specified type of content is present; and
    determining the destination for the received data in a manner so as to load balance multiple possible destinations wherein the computing device is a multi-protocol node on the network, and wherein the multiple techniques include formatting the received data in accordance with a second protocol distinct from a first protocol in accordance with which the received data is formatted.

53. The computing device of claim 52 wherein the computing device is a multi-protocol edge switch.

54. The computing device of claim 52 wherein the first component is executing in memory of the computing device.

55. The computing device of claim 52 wherein the processing components each execute on a distinct processor of the computing device.

* * * * *